United States Patent
Hoffman

(10) Patent No.: US 8,257,217 B2
(45) Date of Patent: Sep. 4, 2012

(54) INFINITELY VARIABLE TRANSMISSION WITH OFFSET OUTPUT SHAFT

(75) Inventor: Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 686 days.

(21) Appl. No.: 12/364,738

(22) Filed: Feb. 3, 2009

(65) Prior Publication Data

US 2010/0197448 A1    Aug. 5, 2010

(51) Int. Cl.
*F16H 37/02* (2006.01)
(52) U.S. Cl. .......................................... 475/216
(58) Field of Classification Search .................. 475/207, 475/209, 214, 215, 216, 217; 476/39, 40, 476/42
See application file for complete search history.

(56) References Cited

U.S. PATENT DOCUMENTS

| | | | |
|---|---|---|---|
| 4,297,918 A * | 11/1981 | Perry | 476/10 |
| 5,194,052 A | 3/1993 | Ueda et al. | |
| 5,230,670 A | 7/1993 | Hibi | |
| 5,453,061 A * | 9/1995 | Fellows | 475/215 |
| 5,564,998 A | 10/1996 | Fellows | |
| 6,063,002 A * | 5/2000 | Nobumoto et al. | 477/41 |
| 6,099,431 A * | 8/2000 | Hoge et al. | 475/216 |
| 6,155,951 A | 12/2000 | Kuhn et al. | |
| 6,217,473 B1 * | 4/2001 | Ueda et al. | 475/216 |
| 6,251,039 B1 * | 6/2001 | Koga | 475/216 |
| 6,517,461 B2 * | 2/2003 | Shimizu | 475/216 |
| 6,561,942 B2 * | 5/2003 | Wehking | 475/216 |
| 6,599,216 B1 * | 7/2003 | Wafzig et al. | 475/214 |
| 6,705,964 B2 | 3/2004 | Nagai et al. | |
| 6,932,739 B2 * | 8/2005 | Miyata et al. | 477/41 |
| 6,949,045 B2 * | 9/2005 | Wafzig et al. | 475/216 |
| 7,077,023 B2 | 7/2006 | Mori et al. | |
| 7,217,216 B2 * | 5/2007 | Inoue | 475/215 |
| 7,293,543 B1 * | 11/2007 | Scekic et al. | 123/198 R |
| 7,335,126 B2 * | 2/2008 | Tsuchiya et al. | 475/216 |
| 7,347,801 B2 * | 3/2008 | Guenter et al. | 475/216 |
| 2005/0176547 A1 | 8/2005 | DeFreitas | |

FOREIGN PATENT DOCUMENTS

EP    1388687    2/2004

* cited by examiner

*Primary Examiner* — David D Le
*Assistant Examiner* — Michael Gonzalez
(74) *Attorney, Agent, or Firm* — David B. Kelley; Brooks Kushman, P.C.

(57) ABSTRACT

An infinitely variable power transmission comprising an input shaft, a layshaft, a variator transmitting power from the input shaft to the layshaft, an output shaft, and an internal/external gear pair transmitting power from the layshaft to the output shaft. The output shaft axis may be offset a limited distance from the input shaft axis.

17 Claims, 4 Drawing Sheets

| Gear Number | Number of teeth |
|---|---|
| 31 | 119 |
| 36 | 30 |
| 38 | 80 |
| 40 | 121 |
| 42 | 29 |
| 44 | 147 |
| 46 | 89 |
| 48 | 38 |
| 50 | 122 |
| 52 | 42 |

Fig. 2

| Mode | Speeds Relative to Input Shaft 10 | | | | | | |
|---|---|---|---|---|---|---|---|
| | Variator Output 30 | Layshaft 14 | Intermediate Shaft 16 | Intermediate Shaft 18 | Internal Gear 44 | Carrier 54 | Output Shaft 12 |
| Low | -2.211 | 8.770 | 0.661 | -2.858 | 1.730 | -0.175 | -0.175 |
| Low | -1.642 | 6.514 | 0.661 | -2.123 | 1.285 | 0.000 | 0.000 |
| Low | -0.463 | 1.835 | 0.661 | -0.598 | 0.362 | 0.362 | 0.362 |
| High | -0.463 | 1.835 | 0.661 | -0.598 | 0.362 | 0.362 | 0.362 |
| High | -2.211 | 8.770 | 0.661 | -2.858 | 1.730 | -0.175 | 1.730 |

Fig. 3

| Mode | Clutch 58 | Clutch 60 |
|---|---|---|
| Low / Reverse | | X |
| High | X | |

Fig. 4

INFINITELY VARIABLE TRANSMISSION WITH OFFSET OUTPUT SHAFT

FIELD OF THE INVENTION

This invention relates to the field of automatic transmissions for motor vehicles. More particularly, the invention pertains to transmissions which provide a continuous range of speed ratios, including zero, between the output speed and the input speed.

BRIEF DESCRIPTION OF THE DRAWINGS

FIG. 2 is a table showing the proposed tooth numbers for the gears of the transmission illustrated in FIG. 1.

FIG. 3 is a table showing the speeds of various elements in various operating conditions when the gears have the tooth numbers shown in FIG. 2.

FIG. 4 is a table showing the state of the clutches for each operating mode.

DETAILED DESCRIPTION OF THE INVENTION

Figure 1:
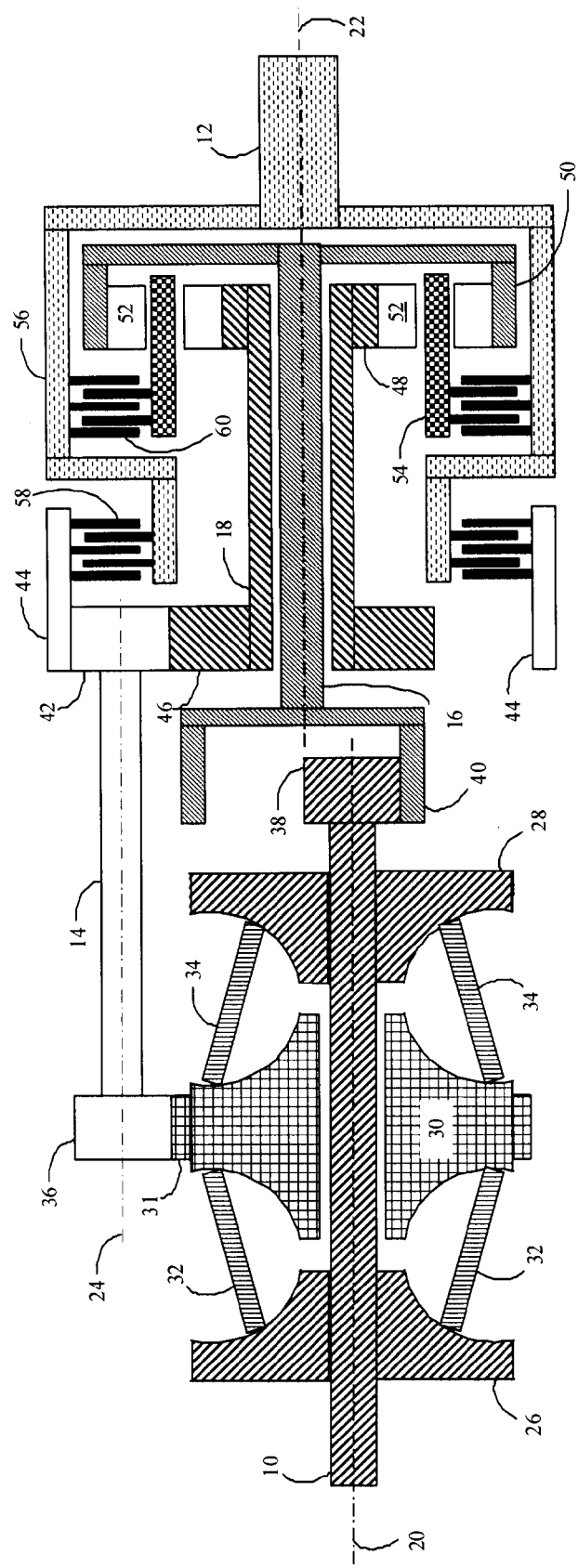
FIG. 1 is a schematic diagram of a transmission according to the present invention.

A transmission according to the present invention is illustrated schematically in FIG. 1. Input shaft 10 is driven by the vehicle engine, preferably via a torsional isolator that smoothes out torque fluctuations due to discrete cylinder firings. Output shaft 12 drives the vehicle wheels, preferably via a differential.

A dual cavity toroidal variator transfers power from input shaft 12 to layshaft 14. The variator is capable of efficiently transferring power at any speed ratio within its ratio range. In the present embodiment, the ratio range of the variator includes 2.211:1 overdrive and 0.463:1 underdrive. Two variator input disks 26 and 28 are driven by input shaft 10. Variator output disk 30 is located between the variator input disks and drives layshaft 14 via external toothed gearing. Two sets of power rollers 32 and 34 transfer power between the input disks and the output disk. The output disk always rotates in the opposite direction of the input 30 disks. The axes about which the power rollers rotate is tilted to control the speed ratio of the variator. In the condition shown in FIG. 1, the radius of the interface between the power roller and the input disks is less than the radius of the interface between the power rollers and the output disk, causing the output disk to rotate at a slower speed than the input disk. When the power roller axes are tilted in the opposite direction, the output disk rotates faster than the input disks.

Two varieties of toroidal variator are well known: full-toroidal and half-toroidal. In a full-toroidal variator, the cavity between an input disk and an output disk is shaped like a torus. In a half-toroidal, as illustrated in FIG. 1, only the inner portion of the torus is used. The present invention is applicable with either variety of toroidal variator.

An internal/external gear pair 44/42 transfers power from the layshaft to the output axis 22. Gear 44 drives the output shaft, via shell 56, whenever high mode clutch 58 is engaged. Internal/external gear meshes are more efficient than external/external gear meshes. Highway driving and a large percentage of city driving occur in high mode, so efficient power transfer is especially important.

If output shaft 12 is on the same axis as input shaft 10, internal gear 44 will have a radius larger than the variator's radius. When interference with other vehicle components is an issue, a smaller internal gear is made possible by displacing the output axis 22 from the input axis 20.

Internal/external gear pair 40/38 transfers power from input shaft 10 to intermediate shaft 16 which rotates about output axis 22. External/external gear pair 42/46 transfers power from layshaft 14 to hollow intermediate shaft 18 which is disposed co-axially with intermediate shaft 16. Intermediate shaft 16 spins in the same direction as the input shaft while intermediate shaft 18 spins in the opposite direction. The speed of intermediate shaft 16 is a fixed proportion of the speed of the input shaft while the speed of intermediate shaft 18 also varies based on the variator speed ratio. Sun gear 48 is connected to hollow intermediate shaft 18. Ring gear 50 is connected to solid intermediate shaft 16. Carrier 54 supports a set of planet gears 52 which mesh with both sun gear 48 and ring gear 50. Carrier 54 rotates about axis 22 at a speed which is a weighted average of the speeds of the two intermediate shafts. Carrier 54 drives output shaft 12, via shell 56, whenever low mode clutch 60 is engaged.

Alternatively, carrier 54 could be solidly connected to output shaft 12 and the low mode clutch used to disconnect one of the other connections to the planetary gear set. Specifically, a clutch that releasably connects sun gear 48 to gear 46 or a clutch that releasably connects ring gear 50 to gear 40 would accomplish the same function as clutch 60.

A number of epicyclic gearing assemblies provide three elements that rotate about a common axis with the speed of one element equal to a weighted average of the speeds of the remaining two elements. These include double pinion planetary gear sets, stepped pinion planetary gear sets, and co-planar gear loops as described in U.S. Pat. Nos. 5,030,184 and 6,126,566. Any of these epicyclic gearing assemblies should be regarded as an equivalent of the simple planetary gear set of the described embodiment.

The number of teeth on the various gears are selected such that carrier 54 is stationary for some variator speed ratio within the variator's available ratio range. This variator speed ratio is called the geared neutral ratio. With the tooth numbers as shown in FIG. 2, the geared neutral ratio is approximately 1:642:1. As a result, in low mode, variator ratios on the overdrive side of the geared neutral ratio will result in reverse drive and variator ratios on the underdrive side will result in forward drive. Furthermore, at a variator ratio near the variator's underdrive limit, the speed of carrier 54 and internal gear 44 are identical. This facilitates the transition from low mode operation to high mode operation. An example of tooth numbers that provide these properties is shown in FIG. 2.

The vehicle is prepared for launch in reverse by disengaging both clutches and setting the variator ratio slightly on the overdrive side of the geared neutral ratio such that carrier 54 rotates slowly backwards. In response to driver demand, clutch 60 is gradually engaged, accelerating the vehicle in reverse. The launch is completed when the speed of the output shaft reaches the same speed as carrier 54 and clutch 60 is completely engaged. As the vehicle accelerates further, the variator ratio is adjusted to obtain a target engine speed selected based on driving conditions.

Similarly, the vehicle is prepared for launch in forward by disengaging both clutches and setting the variator ratio slightly on the underdrive side of the geared neutral ratio such that carrier 54 rotates slowly forwards. In response to driver demand, clutch 60 is gradually engaged. The launch is completed when clutch 60 is completely engaged. As the vehicle accelerates further, the variator ratio is adjusted to obtain a target engine speed.

As the vehicle continues to accelerate, a point will be reached where the variator ratio is at its underdrive limit. At this point, the transmission is shifted from low mode to high mode by releasing clutch 60 while engaging clutch 58. Unlike a gear change in a traditional step ratio transmission, this transition does not involve a change in the speed ratio between the output shaft and the input shaft. Once the transition to high mode is complete, the controller resumes adjusting variator ratio to obtain a target engine speed.

In accordance with the provisions of the patent statutes, the structure and operation of the preferred embodiment has been described. However, it should be noted that alternate embodiments can be practiced otherwise than as specifically illustrated and described.

What is claimed is:

1. A power transmission, comprising:
   an input shaft;
   a layshaft;
   a variator for transmitting power from the input shaft to the layshaft;
   a first external gear fixedly connected to the layshaft; and
   a first internal gear in continuous direct meshing engagement with the first external gear.

2. The power transmission of claim 1, wherein the variator comprises
   first and second variator input disks connected to the input shaft;
   a variator output disk supported for rotation about the input shaft;
   a first set of power rollers in frictional contact with the first variator input disk and the variator output disk; and
   a second set of power rollers in frictional contact with the second variator input disk and the variator output disk.

3. The power transmission of claim 2, further comprising
   a second external gear connected to the variator output disk; and
   a third external gear connected to the layshaft and in continuous meshing engagement with the second external gear.

4. The power transmission of claim 2, further comprising
   an output shaft; and
   a first clutch releasably coupling the first internal gear to the output shaft.

5. The power transmission of claim 4, wherein the output shaft axis is offset from the input axis.

6. The power transmission of claim 4, further comprising a second clutch.

7. The power transmission of claim 6, further comprising an epicyclic gearing assembly with first, second, and third elements, wherein
   the rotational speed of the second element is constrained to be a weighted average of the rotational speeds of the first and third elements;
   the speed of the first element is proportional to the speed of the layshaft whenever the second clutch is engaged;
   the speed of the second element is equal to the speed of the output shaft whenever the second clutch is engaged; and
   the speed of the third element is proportional to the speed of the input shaft whenever the second clutch is engaged.

8. The power transmission of claim 7, wherein the epicyclic gearing assembly is a simple planetary gear set comprising
   a fourth external gear as the first element;
   a second internal gear as the third element;
   a planet carrier as the second element; and
   a set of planet gears supported by the planet carrier and in continuous meshing engagement with both the fourth external gear and the second internal gear.

9. The power transmission of claim 7, further comprising
   a first intermediate shaft connected to the third element of the epicyclic gearing assembly;
   a third internal gear connected to the first intermediate shaft; and
   a fifth external gear connected to the input shaft and in continuous meshing engagement with the third internal gear.

10. The power transmission of claim 7, further comprising
    a second intermediate shaft connected to the first element of the epicyclic gearing assembly; and
    a sixth external gear connected to the second intermediate shaft and in continuous meshing engagement with the first external gear.

11. A power transmission comprising
    an input shaft located on a first axis;
    a layshaft located on a second axis substantially parallel to the first axis;
    a variator which transmits power from the input shaft to the layshaft;
    an output shaft located on a third axis substantially parallel to the first axis and wherein the distance between the first and third axes is less than the distance between the first and second axes;
    first and second variator input disks connected to the input shaft;
    a variator output disk supported for rotation about the input shaft;
    a first set of power rollers in frictional contact with the first variator input disk and the variator output disk;
    a second set of power rollers in frictional contact with the second variator input disk and the variator output disk;
    a first external gear connected to the variator output disk;
    a second external gear connected to the layshaft and in continuous meshing engagement with the first external gear;
    a third external gear connected to the layshaft;
    a first internal gear supported for rotation about the third axis and in continuous meshing engagement with the third external gear; and
    a first clutch releasably coupling the first internal gear to the output shaft.

12. The power transmission of claim 11, further comprising a second clutch.

13. The power transmission of claim 12, further comprising an epicyclic gearing assembly with first, second, and third elements, wherein
    the rotational speed of the second element is constrained to be a weighted average of the rotational speeds of the first and third elements;
    the speed of the first element is proportional to the speed of the layshaft whenever the second clutch is engaged;
    the speed of the second element is equal to the speed of the output shaft whenever the second clutch is engaged; and
    the speed of the third element is proportional to the speed of the input shaft whenever the second clutch is engaged.

14. The power transmission of claim 13, further comprising
    a first intermediate shaft connected to the third element of the epicyclic gearing assembly;
    a second internal gear connected to the first intermediate shaft;
    a fourth external gear connected to the input shaft and in continuous meshing engagement with the second internal gear;
    a second intermediate shaft connected to the first element of the epicyclic gearing assembly; and a fifth external gear connected to the second intermediate shaft and in continuous meshing engagement with the third external gear.

15. A power transmission, comprising:
an input shaft located on a first axis;
a toroidal variator; and
an output shaft located on a second axis wherein the second axis is substantially parallel to the first axis and is offset from the first axis;
an external gear supported for rotation about the first axis; and
an internal gear supported for rotation about the second axis and in continuous meshing engagement with the external gear.

16. The power transmission of claim 15, further comprising
a layshaft with a rotational speed that is proportional to the output speed of the toroidal variator;
a first clutch; and
gearing connecting the layshaft, first clutch, and output shaft such that the speed of the output shaft is proportional to the speed of the layshaft whenever the first clutch is engaged.

17. The power transmission of claim 16, further comprising
a second clutch; and
gearing connecting the input shaft, layshaft, second clutch, and output shaft such that the speed of the output shaft is a linear combination of the speed of the input shaft and the speed of the layshaft whenever the second clutch is engaged.

* * * * *